United States Patent [19]

Martzloff

[11] 4,212,045

[45] Jul. 8, 1980

[54] MULTI-TERMINAL VARISTOR CONFIGURATION

[75] Inventor: Francois D. Martzloff, Schenectady, N.Y.

[73] Assignee: General Electric Company, Schenectady, N.Y.

[21] Appl. No.: 972,448

[22] Filed: Dec. 22, 1978

[51] Int. Cl.[2] .............................................. H02H 1/04

[52] U.S. Cl. ...................................... 361/127; 338/21; 361/56

[58] Field of Search ........................... 361/56, 91, 127; 338/20, 21

[56] References Cited

U.S. PATENT DOCUMENTS

| | | | |
|---|---|---|---|
| 2,935,712 | 5/1960 | Oppenheim et al. | 338/20 |
| 3,764,854 | 10/1973 | Craddock | 361/127 |

FOREIGN PATENT DOCUMENTS

| | | | |
|---|---|---|---|
| 7507645 | 1/1976 | Netherlands | 338/21 |

*Primary Examiner*—Harry E. Moose, Jr.

*Attorney, Agent, or Firm*—Lawrence D. Cutter; James C. Davis; Marvin Snyder

[57] ABSTRACT

A pair of varistor disks, each having one face thereof coated substantially entirely with electrode material and another face thereof coated with spaced-apart electrode material, such as in two semicircular patches, are joined together so that said faces coated with a single electrode are coincident. This configuration reduces by a factor of two the over-all area required for equal current density as compared with certain prior varistor configurations. The varistor of the present invention also exhibits a lower diameter-to-thickness ratio and hence provides a significantly stronger mechanical structure. Additionally, the varistors of the present configuration may be readily provided with grooves between electrode surfaces so as to increase the inter-electrode spacing, without significantly reducing the mechanical strength of the device. The invention of the present structure also permits flexible lead configurations.

10 Claims, 4 Drawing Figures

MULTI-TERMINAL VARISTOR CONFIGURATION

BACKGROUND OF THE INVENTION

This invention relates to metal oxide varistor configurations, and more particularly to configurations useful in the protection of polyphase electrical circuits.

Polyphase electrical power distribution systems or electrical devices, such as motors, often require surge voltage protection devices to guard against transient conditions to which these devices are susceptible. Metal oxide varistors, particularly those comprising a major portion of zinc oxide along with other metal oxide additives such as bismuth oxide, cobalt oxide, chromium oxide, and other metal oxide additives, operate in a nonlinear fashion so as to limit the voltage appearing across the terminals of the varistor. These metal oxide varistors are capable of diverting destructive energy surges from a device to which they are electrically connected so that the energy surge is safely absorbed by the varistor. The need and utility of such varistor protection is further detailed in U.S. Pat. No. 3,894,274 issued July 8, 1975 to G. M. Rosenberry, Jr. and assigned to the same assignee as the present application. This patent particularly describes the utility of metal oxide varistor protection for relatively low voltage, polyphase, alternating current motors.

Varistors for protection of polyphase circuits are conveniently packaged in a single device. Prior devices incorporating metal oxide varistors for polyphase voltage protection have typically configured the varistors on a flat disk, one side of which is coated with an electrical contact, the other face of the disk being coated with four half-semicircular electrode contacts. Further, the spacing between the four adjacent contacts is increased by providing grooves in the varistor material between said contacts so as to insure electrical conduction between the two varistor faces rather than between adjacent electrodes on a single face of the varistor. This configuration has a relatively high diameter-to-thickness ratio, particularly in low voltage applications in which the thickness of the varistor disk must be selected to be relatively small so as to provide a low breakdown, limiting, or so-called clamping voltage for the varistor. This high diameter-to-thickness ratio yields a varistor which is relatively easily broken, particularly if grooves are present between adjacent electrode contacts. Moreover, such a varistor configuration does not exhibit a high degree of flexiblity with respect to the placement of electrode leads for external circuit connection.

U.S. Pat. No. 3,693,053 issued Sept. 19, 1972 to T. E. Anderson and assigned to the same assignee as the present invention discloses a metal oxide varistor configuration particularly suitable for polyphase transient voltage suppression. However, the configuration employed in the aforementioned Anderson patent requires an elaborately shaped varistor body which is not easily manufactured and which exhibits low mechanical strength, particularly in low voltage configurations.

SUMMARY OF THE INVENTION

In accordance with a preferred embodiment of the present invention, a metal oxide varistor comprises a pair of metal oxide varistor bodies, each having substantially the same dimensions, and each body having a pair of parallel, opposed faces with a first face on each varistor body possessing an electrode contact covering substantially all of the face and each such varistor body also having a secod face with each of the second faces having a pair of spaced-apart electrode contacts with each such contact covering substantially half of the second face; the pair of varistor bodies are attached so that the first faces, that is, those faces having a single electrode contact are coincident and in electrical contact. In accordance with the preferred embodiment of the invention herein, the varistor bodies comprise disks with a pair of semicircular electrodes on said second face, and a single circular electrode on said first face. To increase the effective interelectrode distance, grooves may be provided between the electrodes, and to further provide greater mechanical strength, these grooves may be oriented at right angles to one another. Electrode leads may be conveniently attached to the electrode contacts of the varistor in a variety of configurations, additionally, conductive foil may be disposed between the pair of varistor bodies so as to provide an electrical lead connection for a common electrode lead.

Accordingly, it is an object of the present invention to provide metal oxide varistors especially useful in the protection of polyphase circuits and in particular for the protection of low voltage electrical devices. A further object of the present invention is to provide a mechanically strong metal oxide varistor having a low diameter-to thickness ratio and requiring a relatively small area for a given current density.

DETAILED DESCRIPTION OF THE INVENTION

Figure 1:
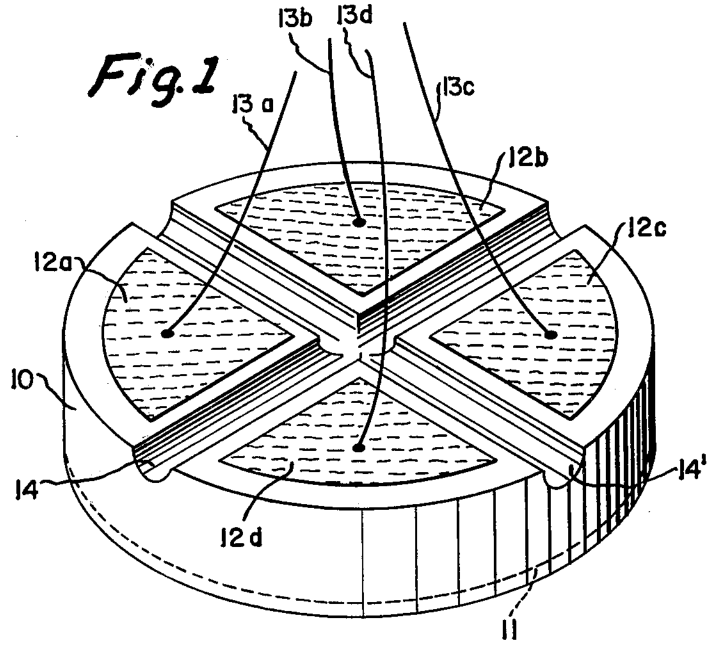
FIG. 1 is a perspective view illustrating a prior art metal oxide varistor for polyphase voltage protection.

FIG. 1 illustrates a metal oxide varistor body 10 in the shape of a disk. The unseen bottom of the disk possesses an electrode 11 shown in phantom view. The upper, or opposite face of the disk possesses four electrode contacts **12*a*–12*d* to which are attached electrical leads 13*a*–13*d*, respectively. The electrode contacts typically comprise halves of semicircles (quadrants) configured as shown with grooved portions 14 and 14' therebetween. The grooved portions provide a greater effective interelectrode distance to insure that conduction occurs between electrodes 12*a*–12*d* and electrode 11, rather than between the electrodes 12*a*–12*d* on the same face of varistor body 10. Since the clamping voltage of the varistor is directly proportional to its thickness, the varistor configuration illustrated in FIG. 1 must be made relatively thin for the protection of low voltage electrical devices. Nonetheless, the current density requirements for many such devices typically remain relatively high so that a relatively large varistor area is also required to meet power density level specifications. These dimensional requirements typically result in a varistor having limited mechanical strength because of the relatively large area and small thickness required. This limited strength is even further diminished when grooves such as 14 and 14' are provided as described above. Thus, the varistor of FIG. 1** requires a relatively large area, as will be more particularly described below, and further exhibits a relatively high diameter-to-thickness ratio.

Figure 2:
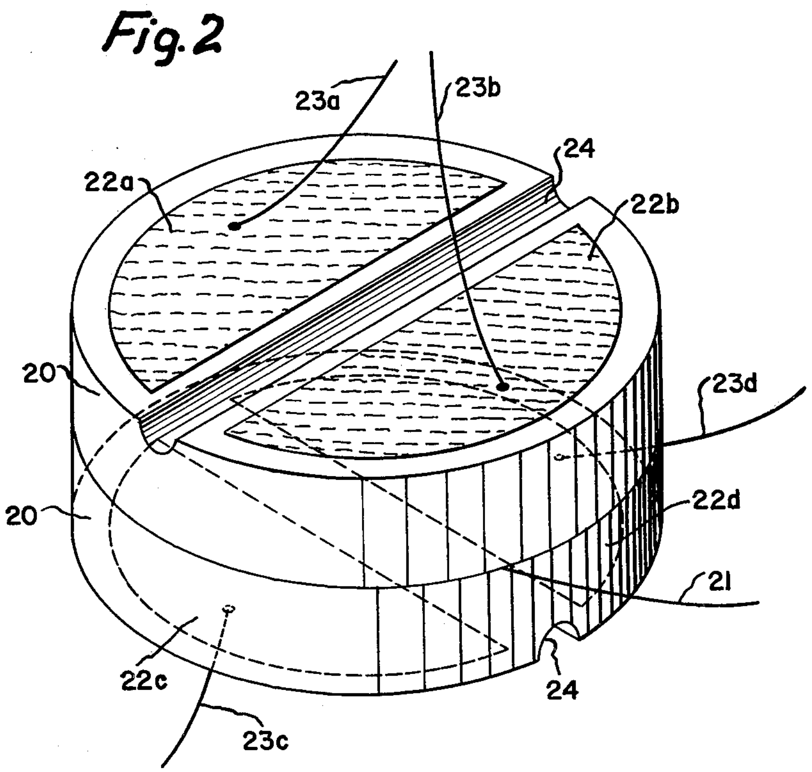
FIG. 2 is a perspective view illustrating one embodiment of the present invention.

FIG. 2 illustrates a varistor configured in accordance with the present invention. In this varistor configuration, substantially identical varistor bodies 20 are configured in a disk shape with a first circular face thereof possessing an electrical contact and a second parallel face thereof possessing a pair of semicircular contacts. Groove 24 is optional and may be provided to increase the effective interelectrode spacing. Also, since varistors are typically manufactued by sintering to form a ceramic from a pressed powder mixture, the grooves 24 may be conveniently provided during the pressing step of varistor manufacture. Providing the grooves at this stage of manufacture eliminates the necessity for the relatively expensive process of machining the grooves in an already sintered ceramic body.

Thus, the varistor of the present invention is formed by joining together two substantially identical varistor disks so that their circular electrodes are substantially coincident. The finally assembled varistor of the present invention posseses electrodes *22a–22d* and electrode leads *23a–23d*, respectively, as shown in FIG. 2. If desired, common electrode lead 21 may also be provided. This is conveniently accomplished by disposing a conductive foil between the varistor bodies. The foil provides a point of attachment for common electrode lead 21.

The pair of varistor bodies may be assembled by any convenient process such as by disposing therebetween a conductive adhesive material or by soldering, for example. There is no requirement that the two varistor bodies be oriented with respect to one another in any particular direction prior to the joining of the varistor bodies along their common, circular electrode contact. However, the varistor configuration of the present invention is particularly useful in those circumstances in which grooves between the electrodes are provided. In particular, the grooves may be oriented at right angles with respect to each other to provide for greater mechanical strength. Here, and in the appended claims, we speak of the angle between the grooves or between the portions between the electrodes as if the grooves or portions were in the same plane. No confusion should arise from this technique of describing the relative orientations of the assembled disks.

Also, while the above described invention is illustrated for the case in which the varistor bodies are, in fact, disks or flattened cylinders, there is no intent to limit the invention herein to such bodies. In particular, square or rectangular varistor bodies may be just as conveniently employed. The present invention merely requires that the pair of varistor bodies have substantially the same dimensions with each such body exhibiting a pair of parallel planar faces. It is moreover convenient to describe the area of these faces in terms of a single parameter, namely, the diameter of a circular disk, hence, the samples herein employ disk shaped varistor bodies for purposes of illustration.

A simple algebraic comparison of the varistor configurations shown in FIGS. 1 and 2, more particularly illustrates the advantages of the present invention. In the present discussion, therefore, the volume, clamping voltage, current density, power density, and diameter associated with the varistor configuration of FIG. 1 are designated by V, E, J, ρ, and D, respectively; the corresponding properties associated with the varistor configuration of FIG. 2 are designated by the corresponding primed quantities V′, E′, J′, ρ′, and D′, respectively.

The area of the varistor disk in FIG. 1 is designated by A and its thickness by T; the corresponding dimensions of the varistor in FIG. 2 are denoted by A′ and T′, respectively. The area between the electrodes is assumed negligible for illustrative purposes. It is further assumed that there is a current I flowing through the common electrode in each varistor and that the total current is shared equally between the electrode areas. It is further assumed that the voltage across the disk is approximately the breakdown voltage E and E′, respectively. The following table summarizes the resulting relationships where K is a constant of proportionality relating the varistor thickness to the breakdown voltage:

TABLE I

| | FIG. 1 | FIG. 2 |
|---|---|---|
| Volume | $V = AT$ | $V' = A'T'$ |
| Voltage | $E = KT$ | $E' = KT'/2$ |
| Current Density | $J = I/A$ | $J' = I/2A'$ |
| Power Density | $\rho = EI/V$<br>$= KI/A$ | $\rho = E'I/V'$<br>$= KI/2A'$ |
| Diameter/Thickness Ratio | $D/T = (8A/T^2\pi)^{\frac{1}{2}}$ | $D'/T' = (8A'/T'^2\pi)^{\frac{1}{2}}$ |

From the above, it is seen that for equal current densities the area of the varistor configuration in FIG. 1 is twice the area of the varistor configuration in FIG. 2, that is, $A = 2A'$. Likewise, it is also seen that for equal breakdown voltage, the thickness of the varistor configuration in FIG. 1 is half the thickness of the varistor configuration in FIG. 2, that is, $T = T'/2$. Thus, for equal clamping voltage and current density, the varistor configuration in FIG. 1 has a larger area and a smaller thickness. Both of these dimensional considerations contribute to a mechanical structure having significantly reduced strength, particularly for low voltage devices in which the thickness is relatively small. More particularly, the diameter-to-thickness ratio for the prior art varistor configuration shown in FIG. 1 is nearly three times as large as the diameter-to-thickness ratio for the varistor configuration of FIG. 2, that is, $(D/T) = < 8(D'/T')$.

Figure 3:
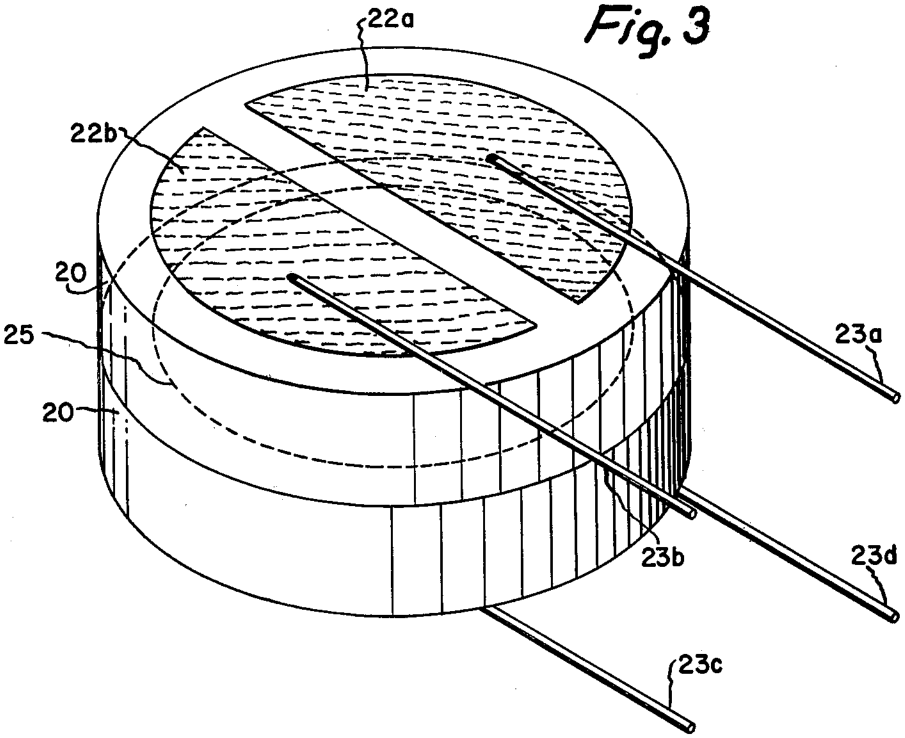
FIG. 3 is a perspective view illustrating a particular lead configuration.

Not only does the varistor configuration of FIG. 2 exhibit superior mechanical properties, particularly in those configurations requiring grooves between electrodes, but the varistor configuration of the present invention also provides a structure exhibiting a high degree of flexibility with respect to the location of electrical leads. In particular, FIG. 3 illustrates an embodiment of the invention in which four electrical leads extend from a single side of the varistor configuration. As shown in FIG. 3, the electrodes *22a* and *22b* are oriented in the same direction as the corresponding electrodes *22c* and *22d*, respectively (not shown), on the lower portion of the configuration. This orientation permits the lead placement shown. Additionally, metal foil 25 may be provided if a common electrode lead (not shown here) is desirable.

Figure 4:
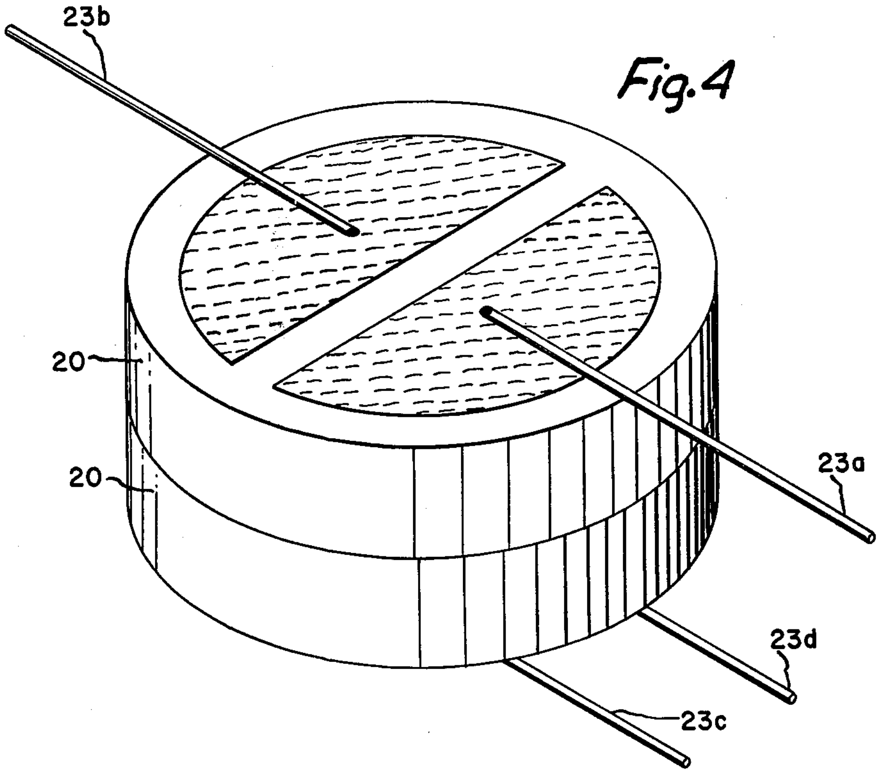
FIG. 4 is a perspective view illustrating another lead configuration.

Similarly, FIG. 4 illustrates another orientation for the leads and electrodes as shown. In particular, although not shown for clarity, the bottom electrodes in FIGS. 3 and 4 are oriented in the same direction as the direction in which electrodes *22a* and *22b* are oriented in FIG. 3. However, electrodes *22a* and *22b* on the upper portion of the varistor configuration are oriented at 90° with respect to the electrodes *22c* and *22d* (not shown) on the bottom portion of the varistor configuration of FIG. 4. This electrode orientation, in addition to being desirable if grooves are provided between the electrodes, is convenient for the attachment of electrode leads 23a–23d as shown in which three of the leads extend from a single side of the varistor configuration and a single electrical lead 23b extends from the opposite side thereof. Again, a common electrode may be provided, if desired, for example, for purposes of connection to a neutral point. It is nonetheless noted that in either the configuration shown in FIG. 3 or FIG. 4, any pair of electrical leads is indistinguishable electrically from the other pair, as long as similarly dimensioned pieces are employed, making the connection by electricians very easy and error-proof.

The electrode contacts may be provided on the varistor surfaces by any convenient process. In particular, a glass and silver frit may be applied to the disks and baked on to form a conductive coating. Other conventional conductive coatings may likewise be applied by a process such as screen printing.

From the above, it may be appreciated that the varistor configuration of the present invention provides a mechanically strong metal oxide varistor particularly suitable for the protection of low voltage polyphase circuits. It is further seen that the varistors of the present invention exhibit a relatively low diameter-to-thickness ratio thereby exhibiting a dimensionally compact structure. It is particularly seen that the varistor configuration of the present invention is very desirable in those circumstances in which grooves are provided between the varistor electrodes. It is also seen from the above that the varistor configuration of the present invention provides for a flexible and convenient placement of the electrical leads attached thereto for connection to external circuitry and particularly for connection to the device which the varistor protects from energy surges.

While this invention has been described with reference to particular embodiments and examples, other modifications and variations will occur to those skilled in the art in view of the above teachings. Accordingly, it should be understood that the appended claims are intended to cover all such modifications and variations that fall within the true spirit of the invention.

The invention claimed is:

1. A metal oxide varistor especially for polyphase circuit protection comprising a pair of metal oxide varistor bodies having substantially the same dimensions, each of said bodies having a pair of parallel opposed faces, a first one of said faces on each said varistor body possessing an electrode contact covering substantially all of said first face, and a second one of said faces on each said varistor body possessing two spaced-apart, noncontacting electrode contacts, each covering substantially half of said second face, said pair of varistor bodies being attached so that said first faces are coincident and said electrodes on said first faces are in electrical contact.

2. The varistor of claim 1 in which each of said varistor bodies possesses a grooved portion between said spaced-apart contacts on said second faces.

3. The varistor of claim 2 in which said grooves are oriented at right angles with respect to each other.

4. The varistor of claim 2 in which said grooves are formed into said varistor bodies during the pressing stage of the varistor manufacture.

5. The varistor of claim 1 further comprising electrical leads attached to each of said electrode contacts on said second faces of said varistor bodies.

6. The varistor of claim 5 further comprising electrically conductive foil disposed between said varistor bodies for attachment of a common electrode lead.

7. The varistor of claim 5 in which the regions between said spaced-apart contacts on each of said varistor bodies are straight and parallel to each other and said leads are attached so as to extend from a single side of said varistor.

8. The varistor of claim 5 in which the regions between said spaced-apart contacts on each of said varistor bodies are straight and are oriented at right angles to each other and three of said leads are attached so as to extend from a single side of said varistor and a fourth lead is attached so as to extend from the opposite side of said varistor.

9. The varistor of claim 1 in which said electrode contacts comprise a frit of glass and silver baked into said varistor bodies.

10. The varistor of claim 1 in which said electrode contacts are attached to said varistor bodies by screen printing.

* * * * *

UNITED STATES PATENT OFFICE
CERTIFICATE OF CORRECTION

Patent No. 4,212,045 Dated July 8, 1980

Inventor(s) Francois D. Martzloff

It is certified that error appears in the above-identified patent and that said Letters Patent are hereby corrected as shown below:

In column 4, line 44, "(D/T) = < 8(D'/T')"

should read -- $(D/T) = \sqrt{8}(D'/T')$ --

Signed and Sealed this

*Twenty-eighth* Day of *October 1980*

[SEAL]

*Attest:*

SIDNEY A. DIAMOND

*Attesting Officer* *Commissioner of Patents and Trademarks*